United States Patent [19]

Stipe

[11] 4,391,295
[45] Jul. 5, 1983

[54] HOT WATER SYSTEM AND VALVE

[75] Inventor: Lester E. Stipe, Portland, Oreg.

[73] Assignee: Precision Plumbing Products, Inc., Portland, Oreg.

[21] Appl. No.: 330,263

[22] Filed: Dec. 14, 1981

[51] Int. Cl.³ .............................................. F24H 1/00
[52] U.S. Cl. ................................. 137/522; 137/515.7; 137/533.19; 137/614.2; 126/362
[58] Field of Search ............... 137/614.2, 334, 533.19, 137/522, 515.7; 126/362; 122/17

[56] References Cited

U.S. PATENT DOCUMENTS

| 8,402 | 9/1851 | Jimason | 137/533.19 |
| 702,157 | 6/1902 | Schreidt | 137/614.2 |
| 966,390 | 8/1910 | Elder | 137/515.7 |
| 2,289,556 | 7/1942 | Stoyke | 137/533.19 |
| 4,286,573 | 9/1981 | Nickel | 126/362 |

Primary Examiner—A. Michael Chambers
Attorney, Agent, or Firm—Eugene D. Farley

[57] ABSTRACT

A hot water system in which a damped, gravity operated, check valve is interposed between the hot water heater and the hot water delivery pipe network. The valve opens when a tap is opened allowing hot water to pass into the pipes and to the tap. The valve is prevented from closing abruptly when the tap is closed by a close fitting cylinder which surrounds the valve piston and restricts fluid flow necessary for valve closure.

3 Claims, 6 Drawing Figures

U.S. Patent   Jul. 5, 1983   4,391,295
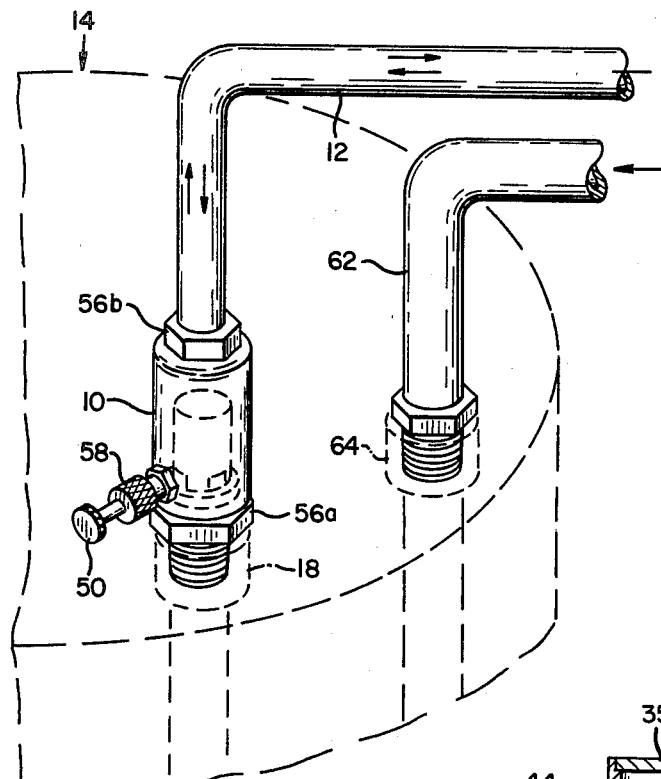
FIG. 1
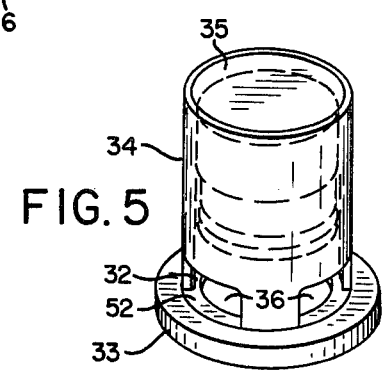
FIG. 5
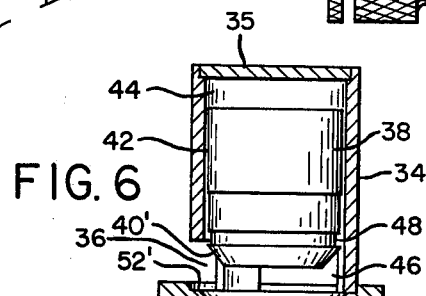
FIG. 4
FIG. 6
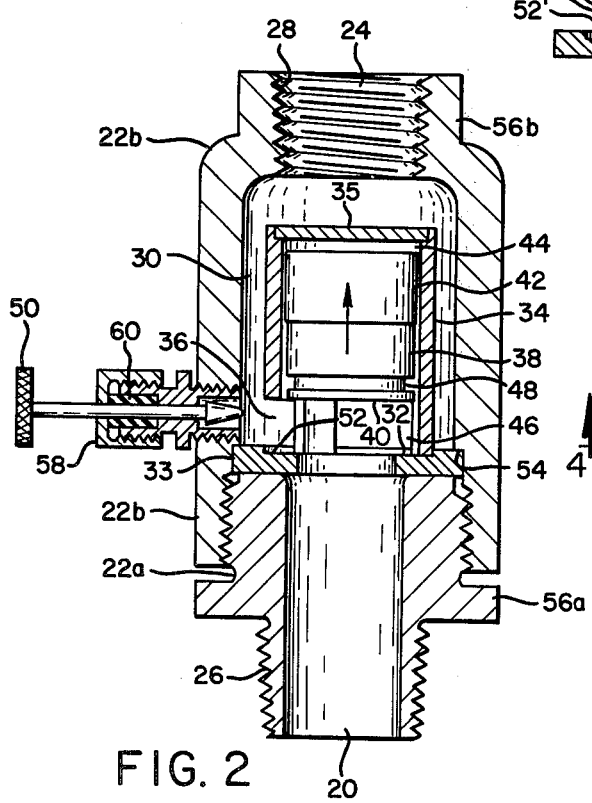
FIG. 2
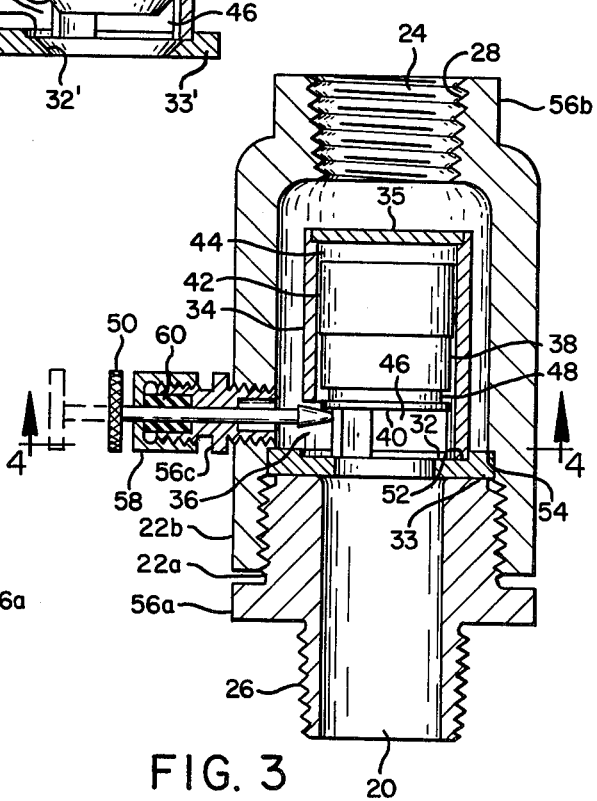
FIG. 3

HOT WATER SYSTEM AND VALVE

BACKGROUND OF THE INVENTION

This invention relates to a hot water system having a provision for limiting heat loss from the hot water delivery pipes, and to a damped, gravity operated check valve for use in such a hot water system.

Prior practitioners in this area have concentrated upon designing hot water systems which would provide instantaneous hot water at a hot water discharge fixture such as a tap which is remote from the water heater location. Systems were designed to eliminate the inconvenience of having to wait for hot water to arrive at the tap while running the tepid water which had been standing in the pipes down the drain. These "instant" hot water systems such as those taught by U.S. Pat. Nos. 3,543,836; 3,556,124; and 3,929,153 employed various methods including hot water return lines, check valves, and even water coolers to ensure that hot water is instantly available at all hot water discharge fixtures within the system. Most of these "instant" hot water systems employed a technique of recirculating the partially cooled hot water which is in the delivery pipes back to the water heater to be reheated through a hot water return line. This approach necessitates the expense of installing additional piping from the most remote hot water fixture back to the water heater.

Of increasing concern currently is the energy cost required to reheat the recycled hot water. Considerable energy can be lost through heat which is radiated along the whole length of the hot water delivery pipe system and the hot water return line. Dramatic increases in energy costs within the past decade make this approach impractical, especially in residential or commercial installations where there are considerable periods during the middle of the day or at night when there will be little or no demand for instant hot water, yet water is being continually heated by the water heater and cooled in the delivery pipes. Consequently, what is needed today is a hot water system which will limit the amount of energy which is wasted through heat loss from the hot water pipes.

A conventional hot water system consisting of a water heater, delivery pipes and discharge fixtures without a hot water return line would lose less heat than would the aforementioned "instant" hot water systems, but would still lose a significant amount of thermal energy through heat radiation from the delivery pipes. Convection currents occurring within the delivery pipes would cause hot water from the water heater to migrate toward the cooler extremes of the delivery pipe network, particularly if the water heater is located below the delivery pipes such as in a basement. In such a configuration, the hotter water would tend to rise toward the delivery pipes in the upper floors, while the cooler water present in the delivery pipes would migrate downward toward the water heater. Thus as in the "instant" hot water system, heat energy is continually generated in the water heater and lost through the pipes, and once-heated water is cooled and reheated.

A check valve installed in the delivery pipe near the water heater would prevent such heat loss due to convection within the pipes. Gravity operated check valves such as those shown in U.S. Pat. Nos. 1,737,588; 1,913,622; 3,929,153; and 3,902,518 could be placed in the delivery pipes in such a way as to open when a discharge fixture is open and close when the discharge fixture is closed. However, the valves disclosed in the aforementioned references include no damping features and they would shut abruptly, causing noise and vibration in the delivery pipe system. This abrupt closure of the valve, in addition to its irritating noise, can have a detrimental effect on the plumbing system because of the resultant vibration.

Accordingly, what is needed is a hot water system that reduces the amount of energy lost through heat radiation from the delivery pipe network, operates automatically, and which does not cause irritating noise or harmful vibration.

SUMMARY OF THE INVENTION

The aforementioned problems associated with thermal energy losses in a hot water system and the noise and vibration associated with known check valves are overcome in the present invention by placing a damped, gravity operated check valve in the hot water delivery pipe leading from the water heater toward the discharge fixtures.

According to the present invention, a damped, gravity operated fluid check valve is placed in the hot water delivery pipe proximate the water heater and prevents the heated water in the water heater from migrating into the delivery pipes to cool. The valve likewise prevents once heated, cooled water present in the delivery pipes from migrating back into the water heater to be reheated. Thus the valve maintains the heated water in the water heater or storage facility which can be easily insulated and confines the major thermal loss of the hot water system to the heat lost from hot water left standing in the delivery pipes.

The valve provided by the present invention opens and allows passage of hot water from the water heater to the discharge fixture or tap when the tap is opened and closes gradually and automatically when the fixture is closed. The valve consists of a valve casing with an inlet passage in the bottom, an outlet passage in the top and a communication passage therebetween. Horizontally fixed in the communication passage is an annular, upwardly-facing valve seat. A weighted valve piston with a valve face on the bottom thereof is arranged above the valve seat for fitting on the valve seat. The piston is closely enclosed by a hollow cylinder which is fixed to the valve seat so as to permit the valve piston to move only vertically within the cylinder. The cylinder is sealed at the top and has ports formed in the bottom of the cylinder wall proximate the valve seat.

In operation, when a tap is opened, the pressure at the outlet passage of the valve is less than the pressure at the inlet passage of the valve. This pressure differential causes the valve piston within the cylinder to rise vertically off the valve seat, allowing hot water from the water heater to pass through the inlet passage, through the opening defined by the annular valve seat, through the ports in the cylinder walls, through the communication passage, out the outlet passage and through the delivery pipes to the tap. When the tap is closed, the pressures at the inlet passage and outlet passage are substantially equal and the weighted valve piston will gradually sink and seat itself on the valve seat. It is prevented from sinking rapidly and closing abruptly by the surrounding close-fitting cylinder. The small annular passage between the piston and the interior cylinder wall is the only passage through which fluid can pass between the sealed upper cavity above the piston and the communication passage. Thus the rate at which the piston can sink to seat itself on the valve seat is governed by the rate at which the water, which would have to be displaced by the downward movement of the valve piston, can pass through this annular passage.

Accordingly, it is a principal objective of the present invention to provide a hot water system which will reduce heat losses from the hot water delivery pipes.

It is a further objective of the present invention to prevent convection between the water heater and the delivery pipes of a hot water system.

It is an associated objective of the present invention to provide a hot water system which does not reheat water which has cooled in the delivery pipes.

It is yet a further objective of the present invention to provide a damped, gravity operated, check valve for use in such a system.

It is an advantage of the present invention that it provides such a valve, the operation of which will not cause noise or vibration in the hot water system.

It is a feature of the present invention that it provides such a valve in which the valve piston is prevented from closing abruptly by a close fitting cylinder surrounding the valve piston.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

FIG. 1 is a fragmentary, partially schematic perspective view of a hot water system and valve embodying the present invention.

FIG. 2 is a sectional elevational view of the valve shown in FIG. 1, in an operational open position, at an enlarged scale.

FIG. 3 is a sectional elevational view of the valve shown in FIG. 1, in a locked open position, at an enlarged scale.

FIG. 4 is a sectional plan view of the valve shown in FIG. 3, taken along line 4—4.

FIG. 5 is a perspective view of the valve piston, base ring, and cylinder of the valve shown in FIGS. 2-4, in an operational open position.

FIG. 6 is a sectional elevational view of an alternative embodiment of the valve components shown in FIG. 5.

DETAILED DESCRIPTION OF THE INVENTION

The present invention provides a hot water system as shown in FIG. 1 by interposing an automatic check valve 10 in the hot water delivery pipe 12 between the water heater 14 and the hot water discharge fixture or tap 16. The valve 10 is preferably placed proximate the hot water outlet 18 of the water heater 14.

Referring to a preferred embodiment shown in FIGS. 2, 3, 4, 5 the valve 10 has a generally vertical inlet passage 20 formed in the bottom valve casing 22a and a generally vertical outlet passage 24 formed in the upper valve casing 22b. The lower valve casing 22a includes a male threaded portion 26 adapted to make a sealed connection with the hot water outlet 18. The upper valve casing 22b has a female threaded portion 28 adapted to make a sealed connection with the delivery pipe 12. A generally vertical communication passage 30 is formed within the body of the upper valve casing 22b and connects the inlet passage 20 with the outlet passage 24. An upwardly-facing valve seat 32 which is the annular central portion of the upper surface of a base ring 33 is secured in the communication passage 30, proximate the inlet passage 20. As shown in FIGS. 2, 3 and 4, the inlet passage 20, base ring 33 and valve seat 32, communications passage 30, and outlet passage 24 are preferably vertically coaxially aligned, with the communication passage 30 having a substantially larger cross-sectional area than the cross-sectional flow area within the annular base ring 33.

A vertical hollow cylinder 34 with a sealed top 35 and ports 36 formed in the bottom portion of the cylinder wall is fixed to the base ring 33 coaxially aligned with the opening defined by the valve seat 32 as shown in FIGS. 2, 3, 4, 5. A weighted valve piston 38 is slidably fitted within the cylinder 34 so that a valve face 40 which is formed on the bottom of the piston will sealingly fit on the valve seat 32. The piston 38 should be of sufficient weight to seat itself firmly on the valve seat 32 and remain seated despite turbulence in the water heater 14 and at hot water outlet 18 which may be caused by the heating element of the water heater. For example, a piston weighing 9 ounces would be satisfactory in a hot water system having a delivery pipe 12 of three-quarter inch diameter. In the preferred embodiment shown in FIGS. 2, 3, 4, and 5, the valve seat 32 and valve face 40 are flat, annular, mating surfaces. In another embodiment shown in FIG. 6, the valve face 40' and the valve seat 32' are mating, frusto-conical surfaces.

Preferably the piston 38 has two diameters, the larger diameter being, e.g., only 0.001 inch less than the interior diameter of the cylinder 34 so that the piston and cylinder define a small annular passage 42 between the upper cavity 44 of the cylinder above the piston and the lower cavity 46 of the cylinder below the piston. The piston 38 is provided with a section having a smaller diameter to reduce friction between the piston and the wall of the cylinder 34 when the piston moves within the cylinder as will be subsequently explained. The piston 38 is further provided with a circumferential groove 48 for receiving a portion of a locking pin 50 which prevents the piston from sinking down to seat the valve face 40 on the valve seat 32. The axially movable locking pin 50 is mounted in the upper valve casing 22b in such a position so that when the valve 10 is open, the locking pin 50 may be manipulated to a position where a portion of the locking pin projects throug a port 36 into the cylinder 34 into the circumferential groove 48 or to a position below the piston 38 as shown in FIGS. 4 and 5, thereby preventing the piston from seating on the valve seat 32.

The base ring 33, piston 38, and cylinder 34 including the cylinder top 35 are preferably assembled as shown in FIG. 5 and FIG. 6 prior to placement within the valve casings 22a and 22b. The base rings 33 and 33' include a recessed ledge 52 and 52' as shown in FIG. 5 and FIG. 6 with the same diameter as the exterior of the cylinder 34 to ensure exact vertical coaxial alignment of the cylinder with the base rings and valve seats 32 and 32'. The cylinder 34 is permanently fixed to the base ring 33 by a suitable method such as soldering. The piston 38 is placed in the cylinder 34 through the open top and the cylinder top 35 is similarly permanently affixed to the cylinder 34 in such a way that the union between the cylinder and the cylinder top is impervious to water. The valve assembly shown in FIG. 5 and FIG. 6 should be made of the same materials or materials with a similar thermal expansin coefficient and of appropriate thicknesses so that the close tolerance defined by the annular passage 42 is not appreciably affected by immersion in hot water, and these materials should also resist corrosion which could similarly affect the close tolerance of the annular passage 42.

The valve assembly shown in FIG. 5 and 6 is located within the communication passage 30 as shown in FIG. 2 and FIG. 3 by threading the lower valve casing 22a into the upper valve casing 22b. A sill 54 formed in the upper valve casing 22b serves to position the base ring 33 and attached valve assembly in the communication passage 30 between the sill and the lower valve casing 22a. The upper and lower valve casings, 22a and 22b, are provided with hexagonal collars 56a and 56b for threading the two portions of the valve casing together and assembling the valve 10. The upper and lower valve casings are constructed of appropriate material of appropriate thickness to achieve a similar thermal expansion coefficient to the valve assembly shown in FIG. 5.

The locking pin 50 is axially movable in a pin casing 58 similarly provided with a hexagonal collar 56c for threading into the upper valve casing 22b as shown in FIG. 2 and FIG. 3. The pin casing 58 is further provided with packing 60 to ensure that water inside the valve 10 is prevented from leaking out around the locking pin 50.

In operation, the valve 10 will automatically remain closed when all of the hot water discharge fixtures such as taps 16 are closed. Gravitational force acting on the weighted valve piston 38 will cause it to remain seated with the valve face 40 sealingly fitted on the valve seat 32. Installed between the hot water outlet 18 and the network of delivery pipe 12, as shown in FIG. 1, the closed valve 10 prevents heated water from migrating into the delivery pipe 12 and likewise prevents cooled water present in the pipe 12 from migrating down into the water heater 14. It will be apparent that without such a valve so positioned, there would be a natural tendency for the hot water in the water heater or storage water heater 14 or storage tank to rise into the delivery pipe network where it would cool by heat radiation from the typically metal pipe 12. Similarly there would be a tendency for the cooled water in the delivery pipe to migrate downwardly towards the water heater 14 which is commonly placed in the basement or on the ground floor. The rising hot water and sinking cooler water would establish a convection current within the delivery pipe 12.

From the foregoing it will be seen that since the amount of heat radiated is directly proportional to the surface of the radiating medium, the large surface area provided by the extensive delivery pipe network can waste considerable heat energy. This heat loss is increased by the continuous circulation set up within the delivery pipe 12 wherein cooled water is reheated in the water heater and cooled again in the pipes. The automatic valve 10 prevents circulation and confines the heat loss to the hot water which is left in the pipe 12 after hot water is drawn through the tap 16.

Since the entire water supply system is commonly under pressure from a remote cold water supply, opening a hot water tap 16 decreases the pressure at the outlet passage 24 of the valve 10, while the water pressure at the inlet passage 20 remains the same. This pressure imbalance causes the water from the inlet passage 20 to press upwardly on the bottom of the piston 38 causing it to rise off the valve seat 32 within the confines of the cylinder 34. This permits hot water from the water heater 14 to pass through the hot water outlet 18, through the valve inlet passage 20, through the aperture of the base ring 33, and into the lower cavity 46 of the cylinder 34. From there the water is free to pass through the ports 36 into the communication passage 30 and out through the valve outlet passage 24 to the pipe 12 and tap 16. Of course the water in the heater 14 is replenished by cold water from the cold water supply pipe 62 which enters the water heater through the cold water inlet 64.

When the tap is closed, the water pressure within the valve 10 stabilizes, and there is no longer a force to push the piston 38 up into the cylinder 34. Gravitational force causes the piston to sink onto the valve seat 32 and closes the valve. However, if the piston 38 were allowed to sink without restriction, the valve would close abruptly with resultant noise and vibration. Consequently one of the features of this invention is a provision to dampen or restrict the rate at which the piston 38 is allowed to drop.

This is accomplished by having the piston 38 closely fitted within the cylinder 34 with a sealed top 35. In order for the piston 38 to drop within the cylinder 34 it must displace an equal volume of water from the lower cavity 46 of the cylinder. The gravitational force on the weighted piston 38 creates a pressure differential with a lower pressure in the upper cavity 44 and a greater pressure in the lower cavity 46. Since the top of the cylinder is sealed, the only passage through which water can flow to equalize this pressure imbalance is through the narrow annular passage 42 between the piston 38 and the interior of the cylinder 34. Thus the rate at which the piston 38 can drop to close the valve is governed by the rate at which water can flow from the lower cavity 46 to the upper cavity 44 through the narrow annular passage 42. This of course can be governed by the area of the annular passage 42. The present invention provides an annular passage of sufficiently small area to prevent abrupt valve closure and excessive noise and vibration. One skilled in the art will appreciate that the invention is not limited to an annular passage as a flow limiting device to damp the operation of the valve but that other methods may be used to restrict the rate of flow.

While the aforementioned principles will also affect the rate at which the valve 10 opens, it should be pointed out that the flow rate through the annular passage 42 would also be affected by the pressure on the piston 38 and that the upward pressure exerted by the water from beneath when a tap 16 is opened would be in excess of the downward force on the piston 38 due to gravity when a tap is closed.

In the event it becomes necessary to drain the hot water system, the locking pin 50 may be manipulated to prevent the valve 10 from closing and trapping water in the hot water delivery pipe 12. First the tap 16 must be opened and the piston 38 allowed to rise within the cylinder 34, opening the valve. The locking pin 50 may then be manipulated so that a portion of the pin extends through a port 36 in the cylinder and into the lower cavity 46 or into the circumferential groove 48 on the piston 38. The hot water system may then be drained by shutting off the cold water supply to the water heater 14 and opening a drain valve customarily located near the bottom of the water heater. With the cold water supply to the heater shut off, and the tap 16 open, the pressures at the inlet passage 20 and outlet passge 24 of the valve 10 would be substantially equal and gravity would normally cause the piston 38 to sink down onto the valve seat 32. The locking pin 50 prevents this, and the hot water present in the pipe 12 is allowed to drain out through a drain valve in the water heater 14.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A gravity operated valve comprising:
   (a) a valve casing comprised of lower and upper sections secured together detachably, the lower section having an inlet fluid passage and the upper section having an outlet fluid passage and a vertically elongated communication passage communicating the outlet passage with the inlet passage,
   (b) a valve seat ring secured removably between the lower and upper valve casing sections and having an upwardly facing annular valve seat facing said communication passage,
   (c) a hollow vertically elongated cylinder secured to said valve seat ring outwardly of the annular valve seat and extending vertically upward into said communication passage, the cylinder having a cylinder wall having an outer diameter substantially smaller than the diameter of the communication passage, the cylinder having a closed top and an open bottom communicating with the valve seat ring opening, the cylinder wall having an opening therethrough adjacent the valve seat ring,
   (d) a weighted piston slidably fitted within said cylinder for vertical movement therein, said piston defining an upper cavity within said cylinder above said piston, said piston having a valve face on the bottom thereof for sealingly fitting on the upwardly facing valve seat on the valve seat ring when the fluid pressures at said inlet passage and said outlet passage are in substantial equilibrium, said piston being free to rise off said valve seat toward the closed top of said cylinder when the fluid pressure at said inlet passage is greater than the fluid pressure at said outlet passage, and
   (e) a flow limiting passage communicating the communication passage in the upper valve casing section with said upper cavity in the cylinder for dampening the speed of movement of the piston in the cylinder.

2. The gravity operated valve of claim 1 including piston locking means extending movably through the upper valve casing section and the opening in the cylinder adjacent the valve seat ring for releasably engaging said piston for releasably holding the valve face on the bottom of the piston separated vertically above the valve seat on the valve seat ring.

3. The gravity operated valve of claim 1 wherein the inlet, outlet and communication passages are in axial alignment.

* * * * *